Dec. 14, 1954  B. S. MASSEY ET AL  2,696,975
AIRCRAFT CABIN AIR-SUPPLY PLANT
Filed Dec. 19, 1950  3 Sheets-Sheet 3
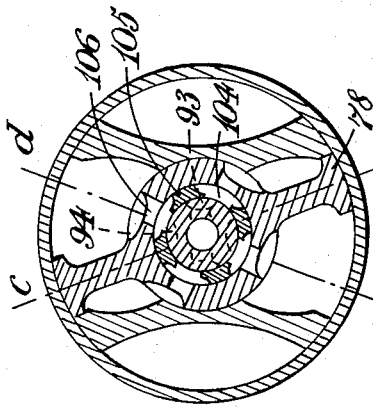
Fig. 4.
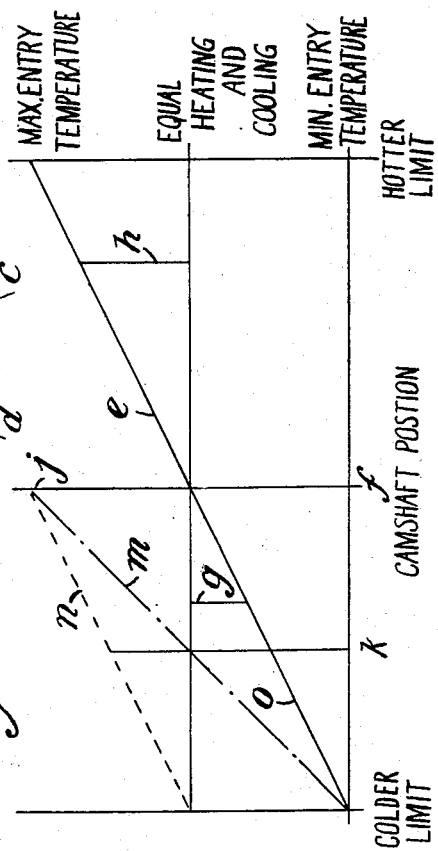
Fig. 5.
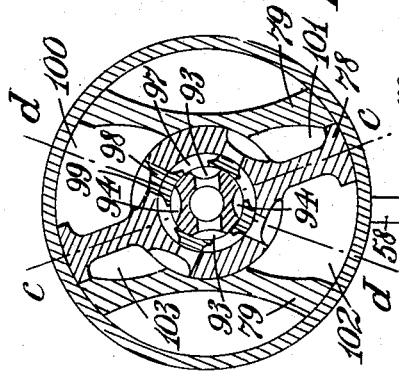
Fig. 3.
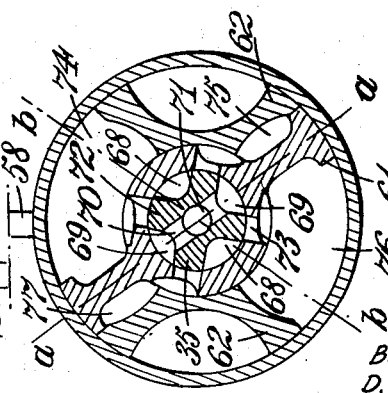
INVENTORS
B. S. MASSEY
D. G. BUSH &
A. A. HOWARTH
by Wilkinson Mawhinney
Attys.

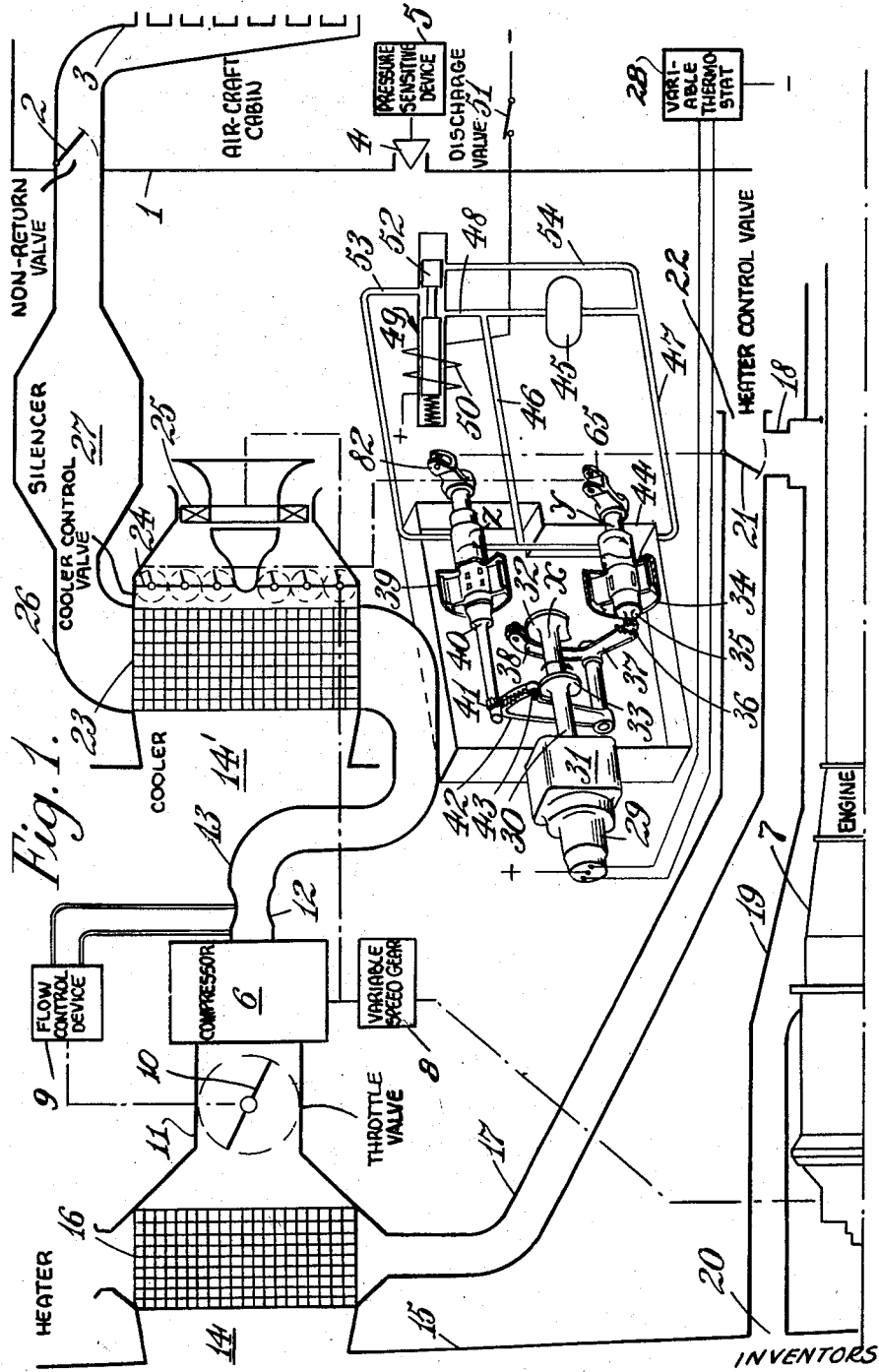

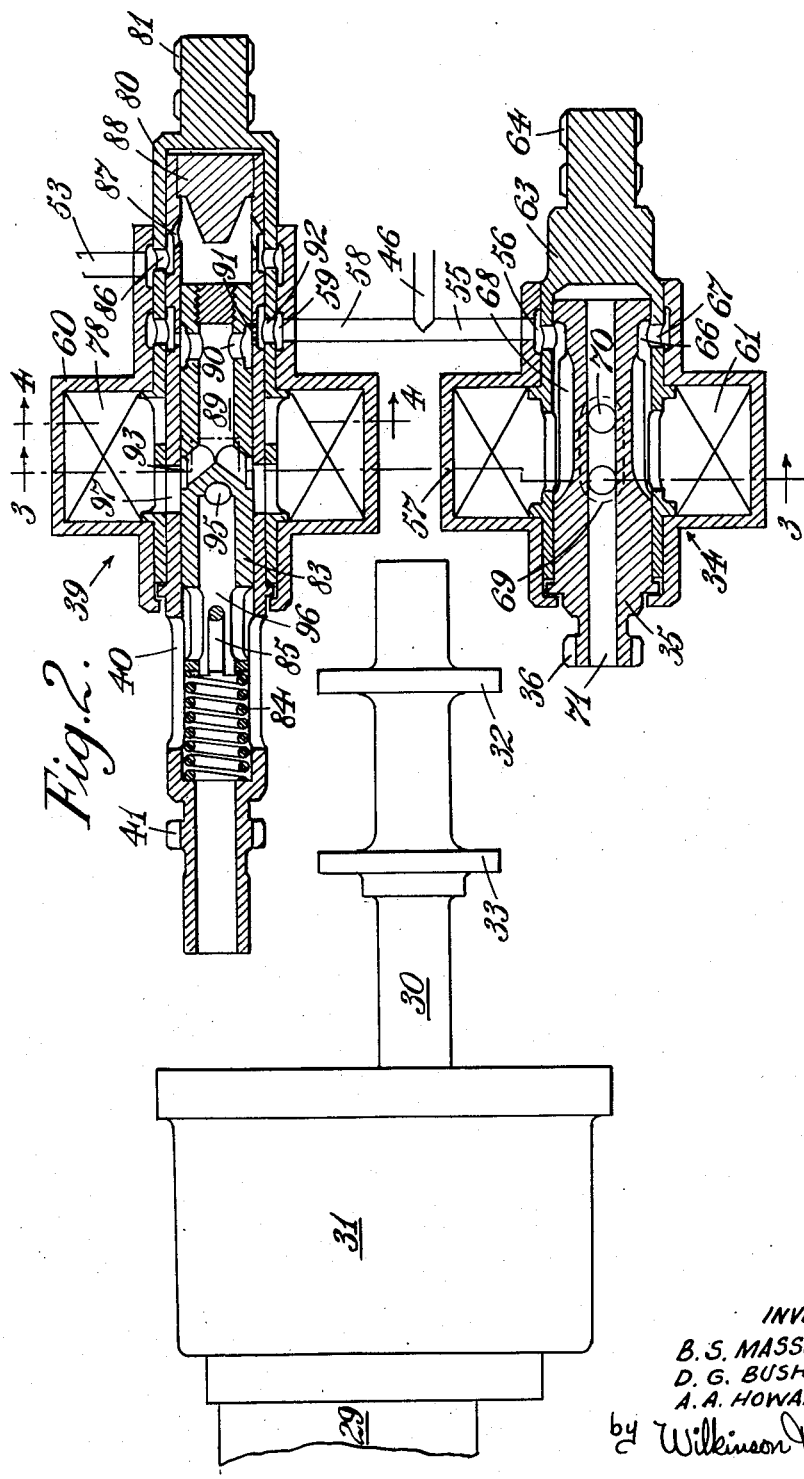

United States Patent Office 2,696,975
Patented Dec. 14, 1954

2,696,975
AIRCRAFT CABIN AIR-SUPPLY PLANT

Bernard Sidney Massey, Denis George Bush, and Arthur Ashley Howarth, Bristol, England, assignors to The Bristol Aeroplane Company Limited, Bristol, England, a British company Application December 19, 1950, Serial No. 201,555

Claims priority, application Great Britain December 23, 1949

10 Claims. (Cl. 257—3)

This invention relates to plants for supplying air to an aircraft cabin in which there is a compressor to supply air to the cabin and additionally there is a heater for said air.

It has been customary to place the heater as the final air-conditioning apparatus through which the cabin air passes before entering the cabin. This has been done to enable the compressor to operate under what were believed to be the most favourable conditions and also so that the heater can be used to re-heat air which passed through a refrigerator unit to lower its temperature to below its dew point to precipitate water in a water separator. These cooling and water separating operations are carried out in order to reduce the humidity of the air in the cabin and are well known.

However, when using a heater of the heat-exchanger type it is found that conditions arise which make the placing of the heater in the customary position referred to unsatisfactory. The reasons for this will now be set out.

The heating medium for a heater of the heat-exchanger type is commonly air drawn through a jacket surrounding a hot part of an engine in the aircraft and the temperature to which this air can be heated is limited by considerations of size and weight of the jacket. Now in order to supply sufficient heat to the cabin to offset the heat which is dissipated therefrom when the aircraft is flying in the conditions of extreme cold experienced at great altitutdes, which heat loss has already been reduced to a practical minimum by careful attention to the insulation of the cabin walls, it is found necessary to heat the air supplied to the cabin to a temperature approaching that of the heating air drawn from the jacket. As these temperatures approach one another the size and weight of a heat exchanger to transfer the required amount of heat increase rapidly and soon reach impractical values.

The present invention is directed to reducing or overcoming the disadvantages of the known apparatus, as set out above, and this is achieved by taking account of the fact that a substantial part of the rise in temperature of the air takes place in the compressor.

The invention accordingly provides an air supply plant in which a heater of the heat-exchanger type is arranged between the air intake opening of the plant and the compressor for supplying air to the cabin, or the first of such compressors when more than one are present.

The air now enters the heater at ambient temperature while the heating medium will be as for the customary disposition of heater so that the temperature difference between the two streams of air in the heater is now considerable and will have increased approximately by the amount of the temperature rise in the main compressor. The increase may be about 175° C. at 30,000 to 40,000 feet altitude. By way of example, it has been found that in certain practical cases this invention has enabled the size and weight of the heater to be reduced to less than 20% of the size and weight of a heater supplying the same amount of heat when arranged after the compressor.

By placing the heater at the air intake to the plant upstream of the compressor the formation of ice at said intake may be reduced or prevented and if, as a result, more heat is added to the cabin air than is required to maintain a certain cabin temperature the excess heat can subsequently be removed from the air by a cooling means prior to its entering the cabin. Such a cooling means is commonly provided to vary the temperature of the air so that a required temperature is maintained in the cabin.

This invention is also concerned with means for controlling the heater and cooling means whereby a desired cabin temperature is maintained both when the heater and cooling means are each separately in use and when the heater is in use for the purpose of reducing or preventing such ice formation with the cooling means in use at the same time.

According to this feature of the present invention the temperature of the air entering the cabin is controlled by means responsive to cabin temperature for bringing said heating and cooling means alternatively into operation at varying rates of heat transfer and there is means for adjusting said control means to bring said heating and cooling means simultaneously into operation and for controlling cabin temperature by varying the relative rates of heat addition and removal.

A cabin pressurising and air conditioning plant embodying the present invention will now be described, by way of example only, with reference to the accompanying drawings, in which:

Figure 1 shows the plant and its control system diagrammatically.

Figure 2 is a vertical section through part of the temperature control system shown in Figure 1.

Figures 3 and 4 are sections along the lines 3—3 and 4—4 respectively in Figure 2.

Figure 5 is a diagram illustrating the operation of the plant under icing and non-icing conditions.

Referring to Figure 1, an aircraft cabin 1 is supplied with air through a non-return valve 2 by a plant arranged in the wing of the aircraft, the air passing along distribution ducting 3, possibly with the addition of recirculated air, to various parts of the cabin as required, and then being returned to the atmosphere at least partly through a discharge valve 4 which is controlled by a pressure sensitive device 5 of known kind which permits the pressure in the cabin to be maintained at a desired value or varied according to a desired law in relation to changes of altitude of the aircraft.

The air supply plant comprises a compressor 6 driven from an engine 7 of the aircraft through a variable speed gear 8. The quantity of air passing through the compressor 6 is controlled by a flow control device 9 acting upon a throttle valve 10 in the compressor intake duct 11 in response to variations in the delivery pressure and in the pressure drop in the throat of a venturi 12 in the outlet duct 13. Means suitable for controlling the flow of air and the variable speed gear are described in the complete specification of British patent application No. 28,003/49.

The compressor 6 draws air from an opening 14 in the leading edge 15 of the wing through one pass of a heater 16 of the heat-exchanger type, the other pass being connected by a duct 17 to an outlet 18 from a jacket 19 which surrounds the engine 7 and is supplied with air under ram pressure through an opening 20 in the leading edge of the wing. The air entering the opening 20 is heated in its pasage over the exterior of the engine 7 and, according to the setting of a valve 21, hereinafter referred to as the heater control valve, is wholly or partly directed into the duct 17 or allowed to escape through an outlet 22. The heated air passing through the duct 17 and the heat exchanger 16 in turn heats the air passing through the compressor 6 into the cabin.

The plant also comprises a cooler 23 of the heat-exchanger type through one pass of which cooling air under ram pressure may flow, from an opening 14' in the leading edge of the wing, when valve flaps 24, hereinafter referred to as the cooler control valve, are opened. For convenience and clarity in the drawing, the openings 14 and 14' have been shown as separate openings, but they are preferably parts of a single opening. A fan 25 driven from the compressor driving shaft is provided for drawing air through the cooler when the aircraft is standing on the ground.

The second pass of the cooler 23 is connected on the one hand to the outlet duct 13 of the compressor and on the other hand by a duct 26 with the cabin 1 by way of the non-return valve 2, a silencer 27 and any other desired conditioning apparatus, such as for example a refrigerator and a water separator (not shown).

The temperature control system comprises a variable datum thermostat 28 in the cabin arranged to send control signals for increasing or decreasing the temperature to a reversible electric motor 29 rotating a camshaft 30 by means of reduction gearing 31. The camshaft carries a cooler control cam 32 and a heater control cam 33. The cooler control cam 32 operates the cooler control valve 24 through a rotary vane type hydraulic servomotor 34 having a pilot valve 35 geared by a pinion 36 and toothed quadrant 37 to the follower 38 of the cam, and the heater control valve 21 is similarly operated through a servo motor 39 the pilot valve 40 of which is geared by a pinion 41 and toothed quadrant 42 to the follower 43 of the heater control cam 33. The camshaft and the servo motors are enclosed in a casing indicated diagrammatically at 44. Operating fluid under pressure is supplied from a pump 45 through a conduit 46 to the servo motors 34 and 39 and after working therein falls to the bottom of the casing 44, from whence it returns through a conduit 47 to the pump. A further conduit 48 from the pressure side of the pump leads to a valve 49 with an operating solenoid winding 50 connected to an anti-icing switch 51 in the cabin, the arrangement being such that upon opening the switch the solenoid is de-energised so that the valve member 52 moves towards the right under the thrust of its return spring and a conduit 53 leading to the interior of the servo motor 39 (as will presently be described) is disconnected from the conduit 48 and connected to a conduit 54 leading back to the low-pressure side of the system.

Referring to Figure 2, which is a vertical section through the temperature control system, certain parts such as the cam followers being omitted, the conduit 46 from the pump 45 has a branch 55 leading to a groove 56 in the casing 57 of the cooler servo motor 34 and a branch 58 leading to a groove 59 in the casing 60 of the heater servo motor 39. The casing 57 of the cooler servo motor contains a rotary vane 61 adapted to travel between abutments 62, see Figure 3, and having a shaft portion 63 provided with splines 64 for the reception of a lever 65 (Figure 1) whereby it is connected to the cooler control valve 24 by a link, indicated by a chain-dotted line. The vane 61 has a central bore wherein the pilot valve 35 is freely rotatable under the control of the cam 32. Opposite the casing groove 56 the pilot valve is provided with a circumferential groove 66 communicating with the former through holes 67 provided in the shaft 63. The pilot valve is also provided with a pair of diametrically opposite grooves 68 extending longitudinally from the groove 66, and between them with a pair of short longitudinal grooves 69 communicating through holes 70 with a central bore 71. The two pairs of longitudinal grooves form between them lands 72 adapted to close four ports 73 in the vane 61 leading to the four working chambers 74 to 77 inclusive of the servo motor (Figure 3). In Figure 3 the vane 61 is shown at one end of its working stroke with its centre along the line aa which corresponds to the cooler control valve 24 being in the closed position, i. e. so that no cooling takes place. Supposing now, in response to a signal for a reduction of temperature from the thermostat 28, the camshaft 30 rotates in the direction of the arrow x in Figure 1, the cam follower 38 moves away from the camshaft and the quadrant 37 rotates the pinion 36 in the direction of the arrow y, which corresponds to rotation of the pilot valve 35 in a clockwise direction as seen in Figure 3. The lands 72 consequently uncover the ports 73 so that fluid under pressure flows from the grooves 68 into the working chambers 75 and 77 and the chambers 74 and 76 are connected to drain through the grooves 69 and the bores 70 and 71. The vane 61 consequently turns in a clockwise direction to follow up the movement of the pilot valve and open the cooler control valve 24 until the ports 73 are again covered by the lands 72. When the vane 61 is in the position bb the cooler control valve is fully open.

The heater servo motor 39 is similarly provided with a van 78 adapted to travel between abutments 79, see Figure 3, and having a shaft portion 80 provided with splines 81 for the reception of a lever 82 (Figure 1) whereby it is connected to the heater control valve 21 by a link, indicated by a chain-dotted line. The vane 78 has a central bore wherein the pilot valve 40 is freely rotatable under the control of the cam 33. The pilot valve comprises an internal bore containing a sliding shuttle valve 83 urged towards the right by a spring 84 and prevented from turning relatively to the pilot valve by a pin and slot connection 85. The right hand end of the bore of the pilot valve constitutes a working chamber for fluid under pressure admitted from the conduit 53 through holes 86 and 87 in the shaft 80 and the pilot valve 40 respectively to act on the shuttle valve 83 and force it to the left against the action of the spring 84 into the position shown in Figure 2. When the anti-icing switch 51 is opened the conduit 53 is connected to drain by the valve 49 with the result that the shuttle valve moves to the right under the thrust of the spring 84 until it abuts a stop 88 closing the bore of the pilot valve. The shuttle valve has a hollow chamber 89 in its right hand end which is in communication on the one hand through holes 90, 91 and 92 in the shuttle valve, pilot valve and vane shaft respectively with the groove 59 into which fluid under pressure is fed by the conduits 46 and 58, and on the other hand with a pair of diametrically opposite ports 93 in the shuttle valve outer surface, see also Figure 3. Between the ports 93 are a pair of drain ports 94 (Figure 3) communicating through holes 95 (Figure 2) with a bore 96 extending into the shuttle valve from its left hand end. When the shuttle valve is displaced towards the left, as shown in Figure 2, the ports 93 and 94 communicate with four ports 97 in the pilot valve, these latter ports forming between them lands 98 adapted to shut off ports 99 leading into the four working chambers 100 to 103 inclusive of the servo motor. When the shuttle valve is displaced towards the right the ports 93 and 94 communicate with four ports 104 in the pilot valve (Figure 4) displaced relatively to the ports 97 by an angle equal to the angular working range of the vane 78 from the line cc to the line dd. The ports 104 form between them lands 105 adapted to shut off ports 106 leading into the four working chambers 100 to 103 inclusive and in angular alignment with the ports 99.

The various figures of the drawings show a condition in which the heater control valve 21 and the cooler control valve 24 are both closed and the anti-icing switch is closed (its "off" position), and it has been shown that a signal from the thermostat 28 for reduced temperature results in the turning of the camshaft in the direction of the arrow x and the consequent opening of the cooler control valve 24 by the servo motor 34. Suppose instead that the thermostat transmits a signal for increased temperature, the motor 29 rotates the camshaft in a direction opposite to the arrow x, the heater cam 33 moves its follower 43 away from the camshaft, while the follower 38 rides on a constant radius part of the cooler cam 32. Only the heater servo pilot valve is therefore affected and this is rotated in the direction of the arrow z, or clockwise as seen in Figure 3, so that the lands 98 uncover the ports 99, fluid under pressure flowing into the working chambers 101 and 103, and the other chambers being connected to drain. The vane 78 accordingly follows up the movement of the pilot valve and opens the heater control valve.

The cams are preferably so shaped that angular displacement of the camshaft follows a straight-line law in relation to cabin inlet temperature (assuming constant ambient conditions and compressor speed) and the operation of the plant may be represented by the diagram shown in Figure 5 in which heat quantities supplied by the heater or removed by the cooler are plotted as ordinates against camshaft angular position to give the sloping operating line e. From the colder limit to an intermediate position f only the cooler is in operation, the heat quantities removed being represented by ordinates such as g. The position f at which both the cooler and heater control valves are closed may be termed an equal heating and cooling position since both are zero. Between f and the hotter limit the heater only is in operation, the heat quantities added being represented by ordinates such as h.

Supposing now that with the plant operating with the camshaft in the position f, corresponding also with the remaining figures, the switch 51 is opened to bring the anti-icing precautions into operation. As already described, this results in the shuttle valve 83 moving to the right in Figure 2. The ports 93 are therefore now in communication with the ports 104 in the pilot valve (Figure 4) instead of with the ports 97 (Figure 3), and these sets of ports are displaced with respect to one another by the full angular travel of the vane 78. The vane accordingly moves from the position cc to the position dd and the heater control valve 21 is correspondingly fully opened. This condition is therefore represented on Figure 5 by the point j, and the air supplied to the cabin will soon be entering at its maximum temperature. Assuming no change in cabin heat requirements, the thermostat 28 will soon signal for a reduction of temperature, causing the camshaft to be rotated in the direction of the arrow x and thereby moving the heater control valve 21 back towards its "off" position and at the same time moving the cooler control valve 24 towards its open position, these movements continuing until equal heating and cooling is again obtained, in the position k in Figure 5, the chain dotted line m being the resultant of the heater operating line n and the cooler operating line o. It will be noted that whereas the cooler cam still operates over the same part of its periphery, the heater cam now operates over a different part and must have an extended operative range accordingly, which is equivalent to the addition of a further cam with an operative range overlapping that of the cooler cam. It will also be noted that with the anti-icing arrangement in operation the same range of temperature control is available, but that the camshaft movement is reduced.

In the foregoing description the amount of overlap has been made such that the heater begins to operate as the cooler control valve begins to close, but according to the characteristics of the plant in relation to the weather conditions liable to be encountered this starting point of the overlapping may be made either earlier or later, that is to say heating may commence while the refrigerator is in operation or only after the cooler control valve has been partly closed, the essential condition being that sufficient heating shall take place in the heater to prevent ice formation on its matrix.

The addition of considerable quantities of heat to the air entering the compressor would be uneconomical at high altitudes since the output of the blower is thereby somewhat reduced, but as already mentioned, icing conditions are not met with at the higher altitudes at which long distance flights are commonly made, so that running of the plant with anti-icing overlap in operation can be dispensed with except for short periods when climbing or descending. At lower altitudes where icing conditions are likely to occur, heating the air entering the compressor has only a small effect on the performance of the compressor and this may be offset by slightly increasing its speed. The capacity of the compressor is normally determined by the maximum altitude of flight required under tropical conditions, and placing the heater before the compressor tends to equalize the maximum altitudes which may be reached with different climatic conditions. It is to be understood therefore that increasing the compressor speed to the slight extent required is not detrimental to the performance of the apparatus as a whole.

We claim:

1. In an aircraft cabin air supply plant comprising a cabin air intake, at least one compressor for delivering the air from the cabin air intake to the cabin, a heater of the heat-exchanger type arranged between the cabin air intake and said compressor, and cooling means for the air from said compressor before the air is delivered to the cabin; means responsive to the temperature of the air within the cabin, automatic control means actuable under the control of said cabin temperature responsive means for bringing said heater and said cooling means alternatively into operation at varying rates of heat transfer over at least a part of the control range to control the temperature of the air entering the cabin, a second control means, means actuable under the control of said second control means to adjust said automatic control means whereby when said second control means is operated said automatic control means alternatively brings said heater and said cooling means simultaneously and individually into operation, the automatic control means, when said heater and cooling means are simultaneously operated, being actuable under the control of said temperature responsive means to control the temperature of the air entering the cabin by varying the relative rate of heat addition and removal by said heater and said cooling means.

2. An aircraft cabin supply plant as claimed in claim 1 in which the means responsive to cabin temperature comprises a variable datum thermostat, and said automatic control means comprises a member movement of which is controlled by said variable datum thermostat, said member having a cam surface for operating said heater and a cam surface for operating said cooling means, said cam surfaces being adjustable in relation to their followers through alternative ranges of movement of said member to bring said heater and said cooling means alternatively into operation at varying rates of heat transfer, and in which said member has a further cam surface adapted to co-operate with one of said followers through a range in which the cam co-operating with the other follower is operative, and said means actuable under the control of said second control means brings into operation alternatively the two cam surfaces arranged to co-operate with said common follower.

3. An aircraft cabin supply plant as claimed in claim 2 in which the rate of heat removal by said cooling means and the rate of heat addition by said heater is each controlled by a separate valve, and said heater control valve and the control valve for said cooling means are adjusted each by a fluid operated servo-motor having a pilot valve controlling the passage of fluid to and from the servo-motor, the pilot valve associated with the heater control valve being adjusted by said cam surfaces adapted to co-operate with said common follower and the pilot valve associated with the control valve for said cooling means being adjusted by said cam surface adapted to co-operate with said other follower, the arrangement being that opening of a pilot valve to a certain extent brings its servo-motor into operation to adjust the control valve associated with the servo-motor, and close the pilot valve when the motor has operated to a corresponding extent, and in which one only of said cam surfaces which co-operate with said common follower overlaps the cam surface co-operating with said other follower to control the passage of pressure fluid to its associated servo-motor through two sets of ports, and valve means is provided selectively to direct pressure fluid to one or the other sets of ports, one set of ports being used for the passage of pressure fluid to said servo-motor when the pilot valve is under the control of that one of the pair of cam surfaces which overlaps the cam surface of the control valve of the cooling means, and the other set of ports being used for the passage of pressure fluid to said servo-motor when the pilot valve is under control of the other one of said pair of cam surfaces.

4. An aircraft cabin air supply plant as claimed in claim 3 wherein a rotary vane servo-motor is controlled by a rotary valve of which the vane of the servo-motor forms one element and of which the other element is adjusted by the cam follower, said two sets of ports being angularly spaced apart around the rotary valve by an amount equal to the range of movement of the motor vane.

5. An aircraft cabin air supply plant according to claim 4 in which the selective valve means comprises a hollow member mounted within the rotary pilot valve and axially adjustable thereof, the interior of said axially-adjustable member constituting a chamber which receives pressure fluid, said chamber being selectively placed in communication with the two sets of pilot-valve ports by adjusting said member axially.

6. An aircraft cabin air supply plant as claimed in claim 5 wherein the axially-adjustable valve member is urged by resilient means to that one of its two positions in which the heater servo-motor is operative while the cooler control valve of the cooling means is open and pressure fluid acts on said member normally to hold it in the other of its two positions.

7. An aircraft cabin air supply plant as claimed in claim 6 in which a valve controls the passage of the holding pressure fluid to, and from, the axially-adjustable valve member, said control valve being urged by resilient means to allow the holding pressure fluid to pass to drain and said means actuable under the control of said second control means normally maintain the control valve so that the holding pressure fluid is applied to the axially-movable valve member.

8. An aircraft cabin supply plant as claimed in claim 7 in which said means actuable under control of said second control means comprises a solenoid, and said second control means comprises a normally closed, hand-operated switch.

9. In an aircraft cabin air supply plant comprising a cabin air intake, at least one compressor for delivering the air from the cabin air intake to the cabin, a heater of the heat-exchanger type arranged between the cabin air intake and said compressor, and a cooler of the heat-exchanger type arranged between the compressor and the cabin; means for regulating the flow of heating medium through said heater, means for regulating the flow of cooling medium through said cooler, and a control member operatively connected to both said regulating means for adjusting both said regulating means simultaneously over at least a part of its range of control movement to vary the rates of flow of said heating and cooling media in opposite senses.

10. In an aircraft cabin air supply plant comprising a cabin air intake, at least one compressor for delivering the air from the cabin air intake to the cabin, a heater of the heat-exchanger type arranged between the cabin air intake and said compressor, and cooling means for the air from said compressor before the air is delivered to the cabin; a first control means for bringing said heater and said cooling means alternatively into operation at varying rates of heat transfer over at least a part of the control range to control the temperature of the air entering the cabin, a second control means, means actuable under the control of said second control means to adjust said first control means whereby when said second control means is operated said first control means alternatively brings said heater and said cooling means simultaneously and individually into operation, the simultaneous operation of said heater and said cooling means by said first control means controlling the temperature of the air entering the cabin by varying the relative rate of heat addition and removal by said heater and said cooling means.

References Cited in the file of this patent

UNITED STATES PATENTS

| Number | Name | Date |
|---|---|---|
| 2,063,477 | Young et al. | Dec. 8, 1936 |
| 2,451,280 | Del Mar | Oct. 12, 1948 |
| 2,491,462 | Wood | Dec. 13, 1949 |
| 2,505,157 | Sparrow | Apr. 25, 1950 |
| 2,592,049 | Linforth et al. | Apr. 8, 1952 |
| 2,632,307 | Massey et al. | Mar. 24, 1953 |